Oct. 18, 1938.    W. JUFFA    2,133,705
GLASS APPARATUS FOR CHEMICAL LABORATORIES
Filed Dec. 1, 1936
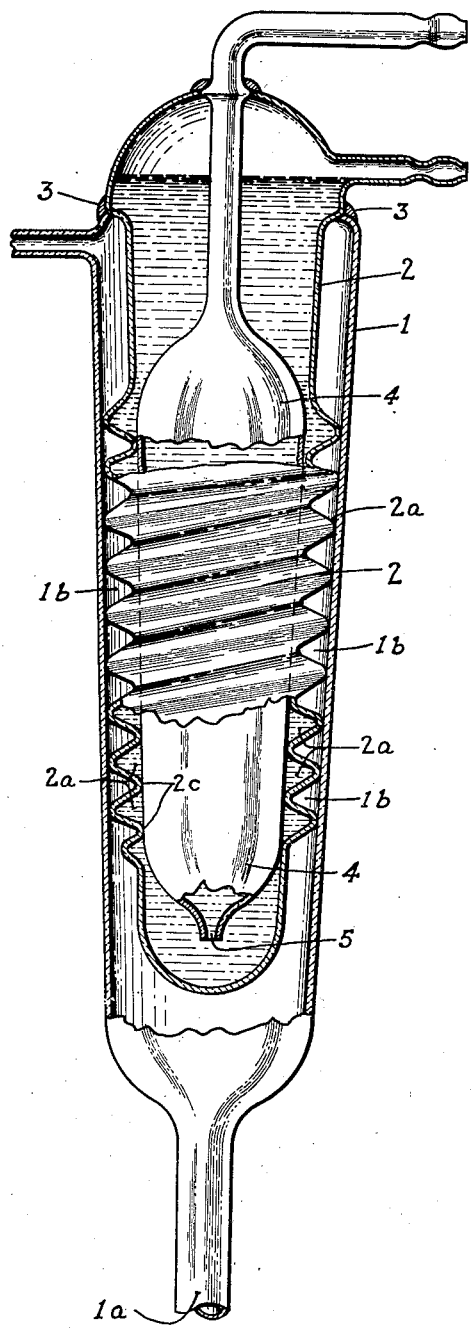
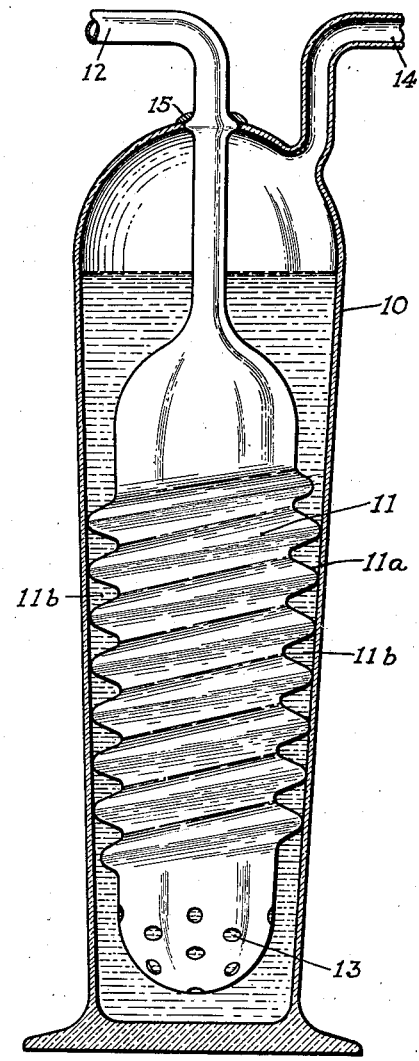
INVENTOR
WILHELM JUFFA
BY
ATTORNEYS Patented Oct. 18, 1938

2,133,705

UNITED STATES PATENT OFFICE 2,133,705

GLASS APPARATUS FOR CHEMICAL LABORATORIES

Wilhelm Juffa, Ilmenau, Thuringia, Germany

Application December 1, 1936, Serial No. 113,548
In Germany May 4, 1936

5 Claims. (Cl. 23—292)

The invention relates to glass apparatus for chemical laboratories comprising an external glass body and a glass helix which is adapted to be inserted therein and is to fit in a liquid-tight or gas-tight manner against the inner wall of the enclosing glass body, that is to say, therefore, helical condensers, helical gas-washing bottles or potash apparatus. The inner glass helix, the outer edge of the windings whereof are to fit closely against the glass enclosing body, serves for carrying the medium being purified or cooled spirally in the windings of the helix. If now the helical windings do not fit tightly against the glass mantle or glass flask, the disadvantage arises that the medium does not run through the spiral windings of the helix but passes upwardly in a straight line between the windings of the helix and the glass mantle, and hence the efficiency of the apparatus is impaired or is destroyed.

Apparatus known heretofore possesses a cylindrical glass body and a likewise cylindrical blown glass helix. In such apparatus, the accurate sealing of the glass helical windings relatively to the glass body gives rise to considerable difficulties. The glass helices must be sorted very exactly until a glass helix is found which agrees exactly with the internal diameter of the glass bottle or glass mantle. Certain deviations in sizes when blowing the glass helix or glass mantle are not to be avoided, however, so that there is considerable waste, and production is considerably delayed by the lengthy sorting operation.

The present invention here provides a remedy by the fact that both the outer glass mantle or the outer glass bottle, and also the glass helix adapted to be inserted therein and forming a lateral seal, are blown conical. This affords the important advantage that any undesired differences in size there may be between the outer glass mantle and the glass helix automatically compensate one another completely since it is merely necessary to insert the conically blown glass helix in the conical enclosing body until the conical outer surface of the helix fits against the conical inner surface of the glass mantle. It is therefore immaterial whether, for example, the wall of the glass bottle is somewhat too thick or not. In the former case, the glass helix will bear against the conical inner surface of the glass mantle sooner during its insertion.

The advantage of the invention is still more effective in the case of helical condensers in which not only is a glass helix to be inserted in a glass mantle, but in addition a core is to be inserted in the glass helix, and both the glass helix is to fit externally in a liquid-tight manner against the glass mantle and also the core is to fit internally in a liquid-tight manner against the inwardly projecting windings of the helix. In the case of such condensers, therefore, three parts which agree exactly have to be capable of insertion one within the other. Heretofore, with the use of cylindrical bodies, this has been extremely difficult. According to the invention, these difficulties are removed since by using the conical core to be inserted in the conically blown helix, the said core is arrested automatically during insertion in the position in which it just fits against the internal windings of the helix.

Due to the present invention, manufacture is considerably simplified and cheapened, and the products are very much better.

Two constructions of the invention may be gathered from the accompanying drawing, in which, by way of example, Figure 1 shows a section for example through a helical condenser.

Figure 2 shows a section through a helical gas-washing bottle.

1 is the outer mantle of glass in which the glass helix 2 may be inserted from above. The outer edges 2a of the helix are to fit in a liquid-tight manner against the inner wall of the mantle 1. For this purpose, according to the invention, both the mantle 1 and also the helix 2 are blown conically, so that the helix 2 need only be inserted until its conical outer surface fits against the conical inner surface of the mantle. The helix 2 will therefore be inserted to a greater or lesser depth according to the wall thickness of the mantle 1. The helix 2 is then fused to the glass mantle at 3.

In addition, adapted to be inserted in the helix 2, is a core 4 for carrying the cooling water said core being provided below at 5 with an aperture. This core 4 is fitted in a liquid-tight manner against the inwardly projecting edges of the helix, that is to say, at 2c and so forth, so that the cooling water supplied from above and issuing downwardly through the aperture 5 will pass successively in a spiral form through the windings of the glass helix, that is to say, through the chambers 2a. According to the invention, this insertable core is also blown conical.

The medium to be cooled enters for example at 1a and then passes through all the spiral windings, that is to say, the chambers 1b and so forth.

Conditions are similar in the case of the gas-washing bottle shown in Figure 2. In this case, 10 is the outer glass bottle and 11 the helix, the windings 11a of which are again to fit against the inner wall of the glass bottle 10, preferably in a gas-tight manner. The gas enters through the aperture 12, then passes through the apertures 13 at the bottom and is then guided spirally around the windings 11 of the spiral, that is to say, it passes in a spiral through the chambers 11b, to issue at 14. In this case, the seal is particularly important because a gas is concerned. Glass bottle 10 is filled with any purifying liquid.

In this case also, according to the invention, both the external glass bottle 10 and also the inserted glass helix 11, which is fused in at 15, are made conical, so that the glass helix has only to be inserted to a greater or lesser extent in order in every case to form a perfect seal against the wall of the bottle 10.

According to the invention, therefore, the radial distances of the spiral circulation passage or passages for the flowing medium between the glass helix 2 and mantle or between glass helix 2 and core 4 are greater in the upper part of the apparatus than in the lower part.

I claim:

1. A glass apparatus for chemical laboratories, comprising a conical glass mantle adapted to be filled with liquid, a hollow glass helix situated within said mantle and comprising conical spiral windings having edge portions which engage said mantle in a fluid-tight manner, the conical shape of the glass mantle corresponding to the cone described by said edge portions, whereby a spiral circulation passage for a flowing medium is formed between the spiral windings of the helix and the mantle, a conduit connected with said helix and communicating with the interior thereof, and another conduit connected with said mantle and communicating with said spiral circulation passage.

2. A glass apparatus for chemical laboratories, comprising a conical outer glass mantle adapted to be filled with liquid, a hollow glass helix situated within said mantle and comprising conical spiral windings having portions engaging said mantle, said windings sealing outwardly and inwardly in a fluid-tight manner, whereby a spiral circulation passage for a flowing medium is formed between the spiral windings of the helix and the mantle, and a conical inner core situated within said helix.

3. A glass apparatus for chemical laboratories, comprising a conical glass mantle adapted to be filled with liquid, and a hollow glass helix situated within said mantle and comprising conical spiral windings having edge portions which engage said mantle in a fluid-tight manner to form a fluid-tight seal, the conical shape of the glass mantle corresponding to the cone described by said edge portions, whereby a spiral circulation passage for a flowing medium is formed between the spiral windings of the helix and the mantle.

4. A glass apparatus for chemical laboratories, comprising a conical hollow glass mantle adapted to be filled with liquid, a hollow conical glass helix situated within said mantle and comprising conical spiral windings having portions engaging said mantle, said windings sealing outwardly and inwardly in a fluid-tight manner, whereby a spiral circulation passage for a flowing medium is formed between the spiral windings of the helix and the mantle, and a conical core fitting within said helix and engaging the windings of said helix.

5. A glass apparatus for chemical laboratories, comprising a vertical conical glass mantle, and a hollow spiral helix situated within said mantle and having edge portions which engage said mantle in a fluid-tight manner, the conical shape of the glass mantle corresponding to the cone described by said edge portions, whereby a spiral circulation passage for a flowing medium is formed between the spiral windings of the helix and the mantle, the radial distance between said circulation passage and the vertical central line of said mantle being shorter at the lower part of said mantle than at the upper part thereof.

WILHELM JUFFA.